Figure 1:
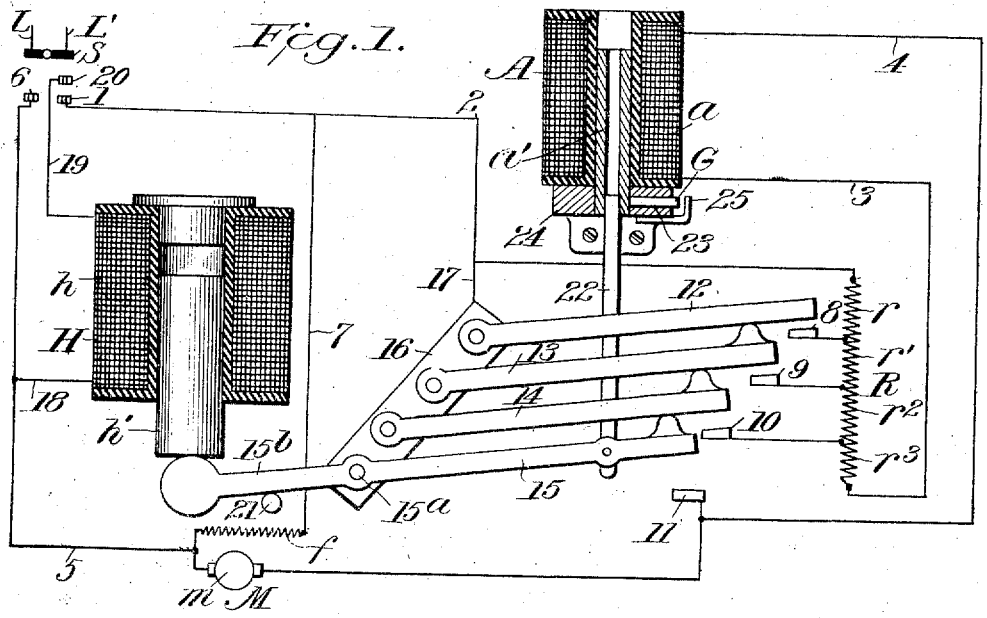

W. C. O'BRIEN.

STARTER FOR ELECTRIC MOTORS.

APPLICATION FILED MAR. 24, 1909.

Reissued Apr. 27, 1909.

12,947.

Witnesses

C. H. Walker.

Newton P. Willis.

Inventor

Wm. C. O'Brien

By

Robert Watson.

Attorney

UNITED STATES PATENT OFFICE.

WILLIAM C. O'BRIEN, OF BALTIMORE, MARYLAND, ASSIGNOR TO MONITOR MANUFACTURING COMPANY OF BALTIMORE CITY, OF BALTIMORE, MARYLAND, A CORPORATION OF MARYLAND.

STARTER FOR ELECTRIC MOTORS.

No. 12,947. Specification of Reissued Letters Patent. Reissued April 27, 1909.

Original application filed June 24, 1907, Serial No. 380,533. Renewed February 14, 1908, Serial No. 415,968. Original No. 891,722, dated June 23, 1908. Application for reissue filed March 24, 1909. Serial No. 485,559.

*To all whom it may concern:*

Be it known that I, WILLIAM C. O'BRIEN, a citizen of the United States, residing at Baltimore, in the State of Maryland, have invented certain new and useful Improvements in Starters for Electric Motors, of which the following is a specification.

This invention comprises improvements in automatic starters for electric motors, the construction and advantages of which will be clear from the following specification taken in connection with the drawing.

Figure 2:
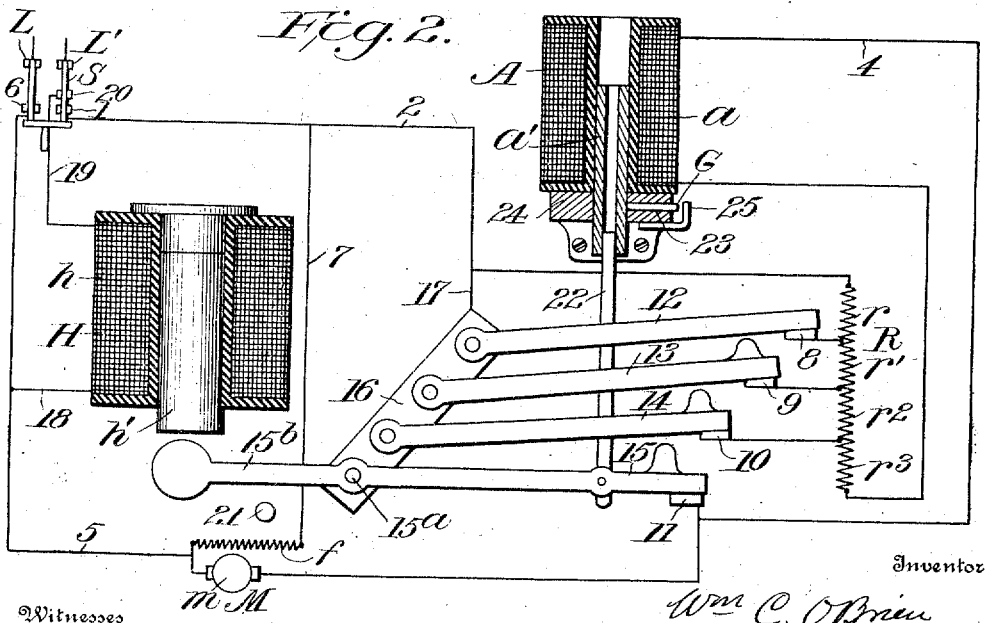

In the accompanying drawing, Figure 1 is a side elevation of a starter embodying my improvements, the solenoids being shown in central section, and the parts being shown in their normal positions; and, Fig. 2 is a similar view, the parts being shown in the positions which they occupy when the motor is running.

Referring to the drawing, L and L′ indicate the line of supply wires and S indicates a hand switch for connecting the motor circuits to the supply circuit. The armature circuit of the motor extends from the switch terminal 1 through conductor 2 and starting resistance R, to conductor 3, thence through the coils $a$ of the solenoid A, thence through conductor 4 to the armature $m$ of the motor M and thence through conductor 5 to the switch terminal 6. The field $f$ of the motor is connected to the line switch terminals 1 and 6 through conductors 2, 7 and 5, as shown. A series of contact steps or surfaces 8, 9, 10 and 11 are connected to successive points in the resistance, which is thus divided into sections $r$, $r'$, $r^2$ and $r^3$, and a series of independently movable contact members 12, 13, 14 and 15 are arranged to rest upon the steps 8, 9, 10 and 11 respectively, and short circuit the resistance and also the coils of the solenoid A, after the motor has been started. These contact members or levers, as shown, are each pivoted to a conducting strip 16 which is connected by a wire 17 to the conductor 2.

The contact member 15 has an arm $15^b$ extending beyond its pivotal point $15^a$, so that said member constitutes a lever which is pivoted between its ends. Above the end $15^b$ of the lever is arranged a holding solenoid H having a core $h$ which normally rests upon the lever, as shown in Fig. 1. The terminals 18 and 19 of the windings $h$ of the solenoid are connected respectively to the conductor 5 which leads to the line switch contact 6, and the auxiliary line switch contact 20, the arrangement being such that when the line switch is closed the solenoid $h$ will be energized and will lift its core off of the lever, as shown in Fig. 2, and when the line switch is opened the core will drop onto the lever, as shown in Fig. 1. The contact members, 2 to 15, inclusive, are arranged one above the other as shown so that when the solenoid core $h$ drops onto the lever 15 the latter will rock into engagement with a stop 21, and in doing so it will lift the contact member 14, which in turn will lift the member 13, and this in turn will lift the member 12, so that all of said members will be moved away from their respective contact steps or surfaces and will remain out of engagement therewith, as shown in Fig. 1, as long as the line switch S is open. The solenoid A is arranged above the contact members and its core $a'$ is connected by a rod 22 to the last contact member or lever 15 in the series, so that said core will move with the lever 15. The core $a'$, as shown in the drawing, is tubular so as to be light in weight and the core $h$ is made solid and heavy enough to overbalance the combined weights of the contact levers and the core $a'$. In the normal positions of the parts, shown in Fig. 1 the core $a'$ is held in its most effective position within the solenoid coils $m$ by the weight of the core $h'$ of the solenoid H.

When the line switch is closed the motor armature receives current through the entire starting resistance R, and the entire starting current flows through the coils of the solenoid A. The core of the solenoid H is instantly drawn up, thus removing the support from the contact levers and the core of the regulating solenoid A and the latter solenoid then supports all of the contact members out of engagement with their respective contact surfaces. These contact surfaces, as shown are arranged at successively greater distances apart, so that as the core of the solenoid moves downward the members 12, 13, 14 and 15 will come into engagement with their respective contacts in succession. When the starting currents falls a certain amount the core $a'$ will move downward until the contact member 12 rests upon the step or surface 8. This will short-circuit the section $r$ of the resistance and, in consequence, there will be a temporary rise in the armature current, which will also strengthen the solenoid A, and this would cause the core $a'$ to again draw up and lift the lever 12 from the surface 8, causing a vibrating movement between the said lever and said surface, unless some means were provided for preventing the upward movement of the core when this temporary rise in current takes place. The vibrating effect would be increased also because, when the lever 12 rests on the step 8 the weight of said lever is taken off of the core; but if the weight of the lever be left out of consideration, it will be seen that the temporary rise of the current would cause an upward movement of the core as soon as the resistance section had been cut out. In order to overcome this difficulty I provide a magnetic clutch consisting of a short iron rod G which is free to move lengthwise in an opening 23 which extends at right angles to the core $a'$ in the non-magnetic bracket 24 which supports the solenoid windings. A suitable retaining device 25 is provided for the purpose of preventing the rod or armature G from falling accidentally out of the opening or socket 23 in handling the apparatus. The end of the armature G engages the side of the core $a'$. When a temporary rise in current occurs owing to the cutting out of a section of starting resistance, the increase of current in the solenoid windings $a$ causes a stronger magnetization of the core $a'$, and this in turn causes the armature G to be attracted more strongly against the side of the core and to thus frictionally prevent the upward movement of the core. Now, with this magnetic clutch, when the section $r$ of the resistance is cut out as before described the member 12 will remain stationary on the contact step 8, notwithstanding the temporary rise in current, and when the current again falls to a sufficient extent, owing to the increased speed of the motor armature, the core of the regulating solenoid will move downward, until the contact member 13 engages the step or surface 9, thereby cutting out the section $r'$ of the resistance, and the clutch G will prevent the upward movement of the core during the temporary rise in current which follows the cutting out of said section $r'$ of resistance. In a similar way, levers 14 and 15 will be lowered on to the contacts 10 and 11, the lever 14 cutting out the resistance section $r^2$, and the lever 15 cutting out the resistance section $r^3$ and the coils of the solenoid A. The motor will then run with the parts in the positions shown in Fig. 2 until the switch S is opened, or the voltage on the line falls to such an extent as to deënergize the holding solenoid H, when the core of the latter will drop and re-set the apparatus in position for starting, the entire resistance being thus re-included in the armature circuit.

The magnetic clutch will, of course, not interfere with the upward movement of the core of the regulating solenoid when the current is cut off and it is arranged only to prevent the upward movement of the core after the latter has moved downward and a temporary rise in current has taken place by reason of the cutting out of the resistance section.

It will be noted that the windings of the solenoid A are arranged in the armature circuit in such manner that the solenoid receives the full armature current until the resistance is cut out.

In the starter above described, while there are a plurality of contact members for cutting out the resistance, it will be noted that these are all controlled in one direction by a single controlling solenoid and are moved in the opposite direction by the weighted core of a single holding solenoid, the arrangement being such as to make a very simple form of starter in which no dash-pot or other mechanical time element is required for retarding the movement of the contact members toward the contact surfaces. It will also be noted that the contact members are moved by the force of gravity in both directions and this further simplifies the apparatus. In this form of apparatus as the core of the regulating solenoid moves downward from its most effective position in its coils, the current in the coils increases in quantity, as the resistance sections are cut out, and the increase in current strength compensates for the less effective positions of the core, the solenoid thus acting as a true retarding device.

What I claim is:—

1. In an automatic starter for electric motors, a resistance arranged in the armature circuit and having contact surfaces or steps, a series of contact members for engaging said steps to short circuit successive sections of the resistance, a regulating device, having a core or armature operatively connected to said members and having windings arranged in the armature circuit, for regulating the movement of said members toward said steps when the current is turned on, and means for automatically moving said members out of engagement with said steps when the current is cut off and for releasing said members when current is turned on.

2. In an automatic starter for electric motors, a resistance arranged in the armature circuit and having contact surfaces or steps, a series of contact members for engaging said steps to short circuit successive sections of the resistance, a regulating solenoid having its core operatively connected to said members and having its windings arranged in the armature circuit, for regulating the movement of said members toward said steps when the current is turned on, and means for automatically moving said members out of engagement with said steps when the current is cut off and for releasing said members when current is turned on.

3. In an automatic starter for electric motors, a resistance arranged in the armature circuit and having contact surfaces or steps, a series of contact members for engaging said steps to short circuit successive sections of the resistance, a regulating solenoid arranged in the armature circuit, for regulating the movement of said members toward said steps when the current is turned on, a magnetic clutch arranged to prevent said solenoid from retracting its core while the resistance is being cut out, and means for automatically moving said members out of engagement with said steps when the current is cut off and for releasing said members when the current is turned on.

4. In an automatic starter for electric motors, a resistance arranged in the armature circuit and having contact surfaces or steps, a series of contact members for engaging said steps to short circuit successive sections of the resistance, a regulating solenoid arranged in the armature circuit, for regulating the movement of said members toward said steps when the current is turned on, a magnetic clutch arranged to prevent said solenoid from retracting its core while the resistance is being cut out, said clutch comprising a magnetizable body arranged to engage the side of the solenoid core, and means for automatically moving said members out of engagement with said steps when the current is cut off and for releasing said members when the current is turned on.

5. In an automatic starter for electric motors, a resistance arranged in the armature circuit and having contact surfaces or steps, a series of contact members for engaging said steps to short circuit successive sections of the resistance, a regulating solenoid arranged in the armature circuit, for regulating the movement of said members toward said steps when the current is turned on, a magnetic clutch arranged to prevent said solenoid from retracting its core while the resistance is being cut out, said clutch comprising a magnetizable body loosely held in a suitable housing at the side of the core and adapted to engage the core, and means for automatically moving said members out of engagement with said steps when the current is turned on.

6. In an automatic starter for electric motors, a starting resistance arranged in series with the armature, a regulating solenoid having windings in the armature circuit, means operatively connected with the core of said solenoid for successively cutting out portions of said resistance as the core moves outward in the windings when current is turned on, means for preventing said core from being retracted while the resistance is being cut out, and means whereby the resistance is automatically introduced in the armature circuit when current is cut off.

7. In an automatic starter for electric motors, a starting resistance arranged in the armature circuit, a regulating solenoid having windings connected in said circuit, a series of contact members and a series of contact surfaces adapted to be engaged thereby for cutting out the resistance and the solenoid windings, the last member in the series being connected to the core of the solenoid so as to move therewith, and said last member, when moved away from its contact surface, being adapted to support the remaining members out of engagement with their respective contact surfaces and to allow said members to come successively into engagement with their contact surfaces when moving in the opposite direction, means for supporting the last contact member in the series away from its contact surface while current is cut off, and electro-magnetic means for removing said supporting means from said member when current is turned on.

8. In an automatic starter for electric motors, a starting resistance arranged in the armature circuit, a regulating solenoid having windings connected in said circuit, a series of contact members and a series of contact surfaces adapted to be engaged thereby for cutting out the resistance and the solenoid windings, said members being superposed so that they will rest one upon the other when the last member in the series is moved from its contact surface, and the core of said solenoid being connected to the last member in the series so as to move therewith and to control the movement of said members toward their contacts, a magnetic clutch arranged to prevent said solenoid from retracting its core while said members are moving to cut out resistance, means for supporting said members away from said contacts while the current is cut off, and electromagnetic means for releasing said members when current is turned on.

9. In an automatic starter for electric motors, a starting resistance arranged in the armature circuit, a regulating solenoid having windings connected in said circuit, a series of contact members and a series of contact surfaces adapted to be engaged thereby for cutting out the resistance and the solenoid windings, the last member in the series being connected to the core of the solenoid so as to move therewith, and said last member, when moved away from its contact surface, being adapted to support the remaining members out of engagement with their respective contact surfaces and to allow said members to come successively into engagement with their contact surfaces when moving in the opposite direction, a weight arranged to normally overbalance the contact members and the core of the regulating solenoid, thereby holding said members out of engagement with said surfaces and holding said core within its coils, and means for automatically lifting said weight when current is turned on.

10. In an automatic starter for electric motors, a starting resistance arranged in the armature circuit, a regulating solenoid having windings connected in said circuit, a series of contact members and a series of contact surfaces adapted to be engaged thereby for cutting out the resistance and the solenoid windings, said members being superposed so that they will rest one upon the other when the last member in the series is moved from its contact surface, and the core of said solenoid being connected to the last member in the series so as to move therewith and to control the movement of said members toward their contacts, said last contact member consisting of a lever pivoted between its ends, a holding solenoid having a core adapted to normally rest on said lever and over-balance the same and the parts movable therewith, said holding solenoid being adapted to lift its core and release the lever when current is turned on.

In testimony whereof I affix my signature in presence of two witnesses.

WILLIAM C. O'BRIEN.

Witnesses:
FELIX R. SULLIVAN,
G. H. WHITTINGHAM.